Sept. 2, 1924.
H. E. HILL
1,506,752
SEPARATOR FOR MILK BOTTLES
Filed Aug. 3, 1922
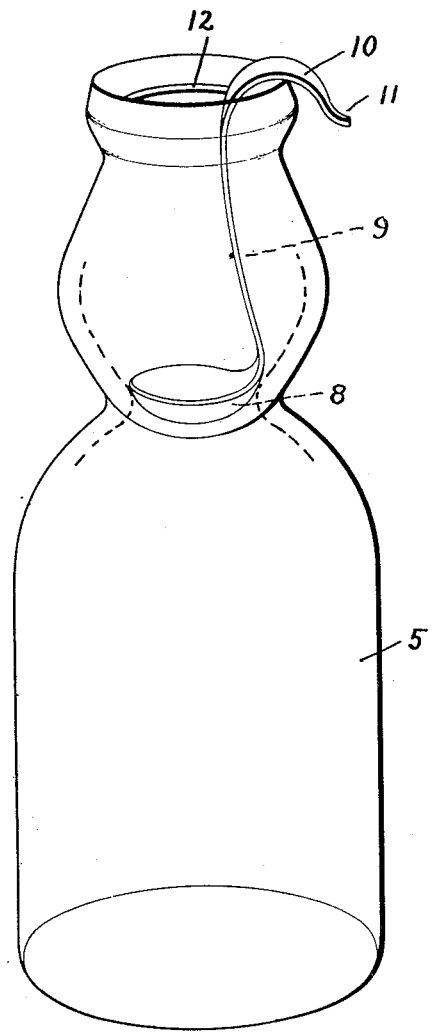
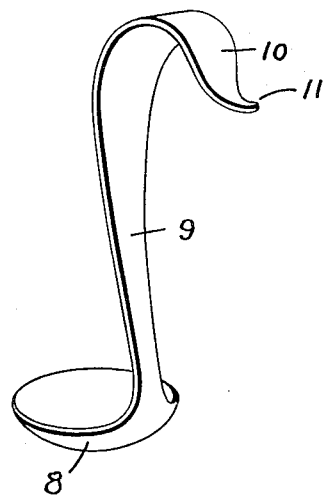
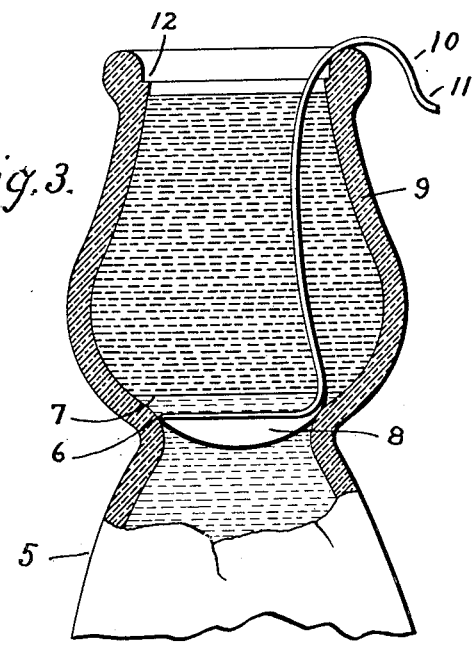
Inventor:
Herbert E. Hill
by Alfred E. Bobson
His Attorney Patented Sept. 2, 1924.

1,506,752

UNITED STATES PATENT OFFICE.

HERBERT E. HILL, OF ALBANY, NEW YORK, ASSIGNOR TO CREAM TOP BOTTLE CORPORATION, OF ALBANY, NEW YORK, A CORPORATION OF NEW YORK.

SEPARATOR FOR MILK BOTTLES.

Application filed August 3, 1922. Serial No. 579,537.

*To all whom it may concern:*

Be it known that I, HERBERT E. HILL, a citizen of the United States, residing at Albany, in the county of Albany and State of New York, have invented certain Improvements in Separators for Milk Bottles, of which the following is a specification.

The present invention relates to separators for milk bottles and has for its object to provide an improved separator for use with the milk bottle disclosed in the application of Norman A. Henderson, Sr. No. 461,928, filed April 16, 1921.

For a consideration of what I believe to be novel and my invention, attention is directed to the accompanying description and the claims appended thereto.

In the drawing, Fig. 1 is a side elevation of a milk bottle of the type referred to above with my improved separator therein; Fig. 2 is a perspective view of the separator, and Fig. 3 shows the upper portion of the bottle in section and the separator therein.

Referring to the drawing, 5 indicates a bottle of the type disclosed in the above-referred-to Henderson application wherein the neck of the bottle is so shaped or has such a contour that it presents an internal shoulder or seat 6 at a point at or slightly below the cream line, which shoulder or seat is preferably of a diameter less than the mouth of the bottle at its narrowest diameter. It will be understood that by the term "cream line" is meant the point of separation between the cream and skim milk after the cream has risen to the top of the bottle. In Fig. 3 this point is indicated at 7. With such a bottle the cream will gather in the portion of the bottle above seat 6 which portion is preferably made bulb-shaped as shown. It may be removed by introducing a disk-shaped separator through the mouth of the bottle into engagement with seat 6 to form in substance a partition in the bottle which separates the cream from the skim milk and while holding the separator in this position tipping the bottle to pour off the cream.

According to my invention, I provide a separator somewhat of the form of an ordinary cream ladle. It has a bowl 8 provided with a rounded bottom of a size to engage seat 6 and a handle 9 of sufficient length to project beyond the mouth of the bottle when the bowl is on seat 6. The bowl is of a diameter slightly less than the diameter of the mouth of the bottle and is rounded sufficiently so that its lowest point sets down somewhat below seat 6 while its top edge is above the seat. With this arrangement the bowl may assume various angles with the plane of the seat and still rest on it all around.

The end of the handle is curved over as indicated at 10 the arrangement being such that with bowl 8 on seat 6 the curved portion of the handle lies over the edge of the bottle's mouth. Preferably the highest portion of the curve will stand slightly above the edge of the mouth and the surface to either side of the top of the curve may be brought into engagement with the inside or outside edge of the mouth of the bottle by tilting the handle forward or back. This movement however, will not affect the seating of the bowl on seat 6 because of the rounded shape of the bowl. Such arrangement avoids the necessity of accurately dimensioning the separator and takes care of any variations in the dimensions of the bottles. The handle is made amply long to take care of the greatest variations in dimensions met with.

The tip of the handle is pointed and is curved outwardly as indicated at 11 which adapts it for use in removing the ordinary milk bottle cap (not shown) which seats on ledge 12 at the mouth of the bottle.

The separator may be made of any suitable material but preferably I make it of a metal which is non-corrosive and easily kept clean.

In use, the pointed tip 11 is slipped under the edge of the milk bottle cap and given a turning movement to pry up the cap, the edge of the mouth of the bottle serving as a fulcrum on which the underside of the pointed tip 11 turns. This provides for the easy removal of the cap and does not require that the pointed tip be stuck into the cap but only under its edge, the point being inserted between the edge of the cap and the surface of the bottle neck.

After the cap has been removed, the bowl 8 is inserted edgewise through the mouth of the milk bottle and brought down into engagement with seat 6 as shown in Figs. 1 and 3, the curved end 10 being hooked over the edge of the mouth of the bottle. The separator is then held in this position and the bottle tipped to pour off the cream from the top of the bottle.

My improved separator has the advantage that it is very easy to use, requiring the use of but one hand. In use the bottle may be grasped around its neck by the thumb and the second, third and fourth fingers of the hand, the first finger being placed on top the curved end 10 of the handle to hold bowl 8 on seat 6. Curved end 10 may be held by the first finger in either its forward or back position, i. e., against either the inner surface or the outer surface of the edge of the mouth of the bottle and in either case the bowl 8 will be held firmly on seat 6. By this means a firm grip is obtained on both the bottle and the separator and the bottle can be easily lifted and tilted without danger of the separator slipping. The other hand may be used to hold the container into which the cream is to be poured.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A separator for use with a milk bottle which presents an upwardly facing seat at approximately the cream line, said separator comprising a stiff bowl adapted for engagement with such a seat and a handle rigidly fixed to the bowl and of a length such that it will project beyond the mouth of such a bottle when the bowl is on its seat, said handle having an angular relation to the bowl such that the handle will lie against the edge of the mouth of such a bottle when the bowl is seated.

2. A separator for use with a milk bottle which presents an upwardly facing seat at approximately the cream line, said separator comprising a stiff bowl and a handle rigidly fixed to the bowl and provided with a curved end, the distance from the bowl to the curved end being approximately equal to the distance from the seat to the mouth of the bottle with which such separator is to be used, and said handle having an angular relation to the bowl such that when the bowl is seated, the handle will engage the side of the bottle mouth.

3. A separator for use with a milk bottle which presents an upwardly facing seat at approximately the cream line, said separator comprising a curved disk of non-flexible material and a handle rigidly fixed to the edge of the disk and provided with a curved end, said handle being of such length that when the disk is placed on the seat of the bottle with which the separator is to be used, such curved end will lie over the edge of the mouth of the bottle.

In witness whereof, I have hereunto set my hand this 28 day of July, 1922.

HERBERT E. HILL.